Patented July 8, 1952

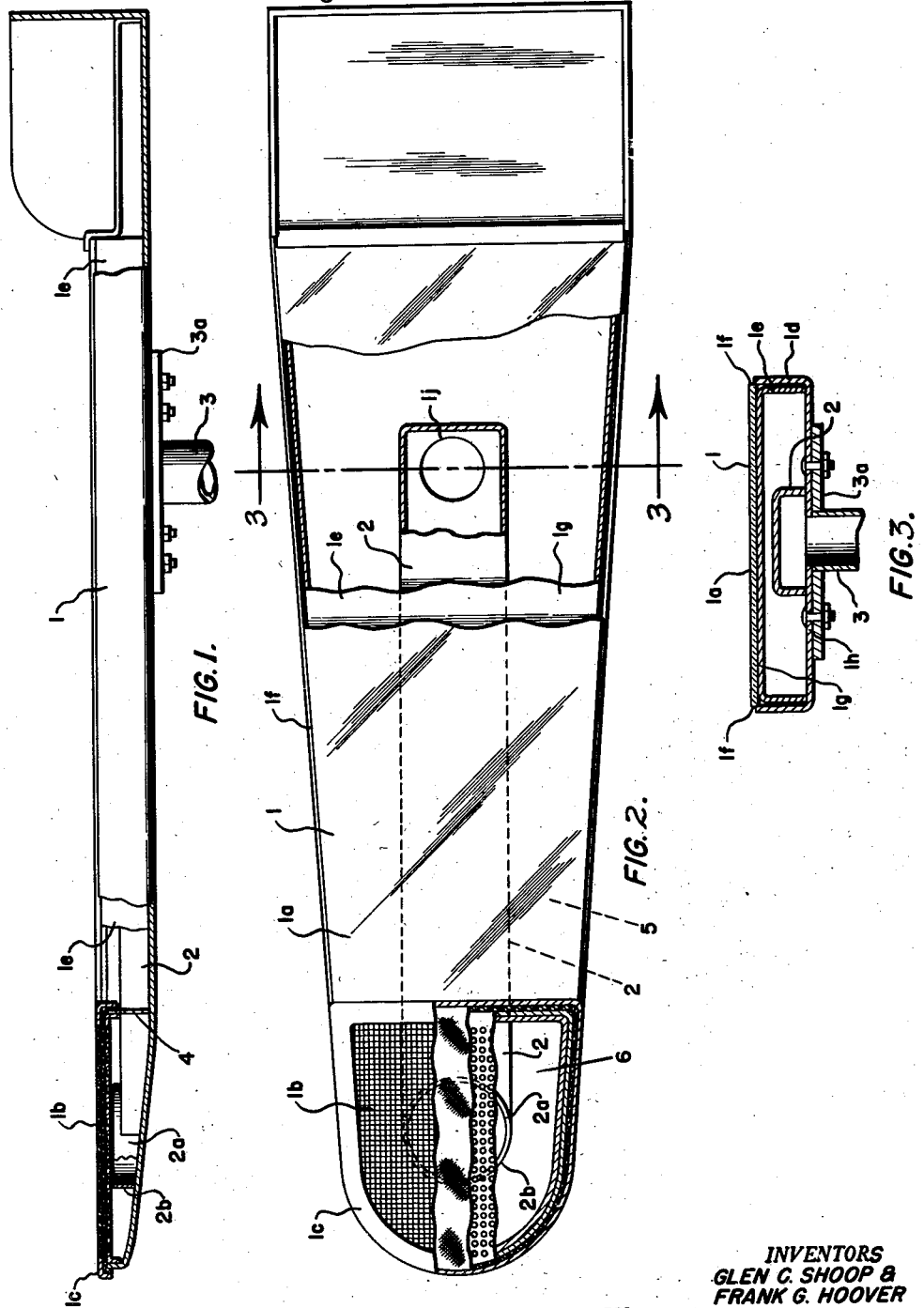

2,602,316

UNITED STATES PATENT OFFICE 2,602,316

SPOTTING BOARD CONSTRUCTION

Glen C. Shoop and Frank G. Hoover, Escondido, Calif.

Original application December 28, 1946, Serial No. 719,006. Divided and this application January 8, 1948, Serial No. 1,084

4 Claims. (Cl. 68—240)

Our invention relates to a spotting board of the type disclosed in application Serial No. 719,006, filed December 28, 1946, of which this application is a division, and the objects of our invention are:

First, to provide a spotting board of this class in which the vacuum conductor therein is constructed of sheet metal and forms part of the spotting board structure:

Second, to provide a spotting board of this class which is very simple and economical in construction, efficient in operation and which will not readily deteriorate or get out of order.

With these and other objects in view as will appear hereinafter, our invention consists of certain novel features of construction, combination and arrangement of parts and portions as will hereinafter be described in detail and particularly set forth in the appended claims, reference being had to the accompanying drawings and to the characters of reference thereon forming a part of this application in which:

Fig. 1 is a fragmentary side elevational view of our spotting board;

Fig. 2 is a plan view thereof showing portions broken away and in section to amplify the illustration; and Fig. 3 is a sectional view taken from the line 3—3 of Fig. 2.

Similar characters of reference refer to similar parts and portions throughout the several views of the drawings.

The spotting board 1, vacuum channel 2, and the suction leg 3 constitute the principal parts and portions of our spotting board.

The spotting board 1 or trough is divided by partition 4 into a large compartment 5 and the small one 6, and is provided with a glass top 1a over the larger compartment and a screen 1b over the other compartment adjacent the glass top 1a outlined by frame 1c beneath which the open end of the vacuum channel 2 is positioned as shown in Figs. 1 and 2 of the drawings, the open end 2a sometimes hereinafter referred to as "suction nozzle" or "inlet" of this vacuum channel 2 is defined by a substantially cylindrical portion 2b extending into close proximity to the screen 1b concentrating the vacuum drawn upon a limited portion of the screen 1b.

As shown in cross section in Fig. 3, the spotting board or trough is composed of two casings 1d and 1e. The lower casing 1d is a pan-like body that provides the bottom of the spotting board and extends upwardly at the sides thereof in the form of a wall-like rim retaining opposite edge portions 1f of the glass top 1a. The upper casing member 1e fits inside the lower casing 1d and the uppermost portion 1g of the casing 1e is below the uppermost portions of the casing 1d at opposite edges 1f of the glass top member 1a, thus the glass top member 1a is completely supported intermediate opposite legs or walls of the casing 1d which retains the same in position. By reason of this construction the inverted bottom of pan-like casing 1e provides an excellent support for the glass top while the rim of casing 1d retains it in safety. It will be here noted that the vacuum channel 2 is an inverted channel and that the lower side or floor 1h of the casing 1d also provides the lower side of the vacuum channel 2 as shown best in Fig. 3 of the drawings.

The upper end of the suction leg 3 is provided with a flange 3a which is secured to the lower side 1h of the casing 1d around the opening 1j in said lower side 1h of said casing 1d. This suction leg is a hollow cylindrical member and communicates with the interior of the vacuum channel 2 and also supports the spotting board 1 all as shown best in Figs. 1 and 3 of the drawings.

Though we have shown and described a particular construction, combination and arrangement of parts and portions, we do not wish to be limited to this particular construction but desire to include in the scope of our invention the construction, combination and arrangement substantially as set forth in the appended claims.

Having thus described our invention what we claim as new and desire to secure by Letters Patent is:

1. A trough construction for a spotting board comprising: a first pan-like body having a wall-like rim projecting upwardly; a second pan-like body having a wall-like rim projecting downwardly and nested within the first said wall-like rim so that the inverted bottom of the second pan-like body will be below a plane tangent to the edges of the rim of the first pan-like body, a glass top disposed on the inverted bottom with the edges of said glass top engaged by the wall-like rim of the first pan-like body.

2. A trough construction for a spotting board comprising: a first pan-like body having a wall-like rim projecting upwardly; a second pan-like body having a wall-like rim projecting downwardly and nested within the first said wall-like rim so that the inverted bottom of the second pan-like body will be below a plane tangent to the edges of the rim of the first pan-like body, a glass top disposed on the inverted bottom with the edges of said glass top engaged by the wall-like rim of the first pan-like body; a partition dividing said first body into separate compartments and an inverted U-shaped suction channel having the open side disposed on the floor of both compartments to close said open side and to provide a suction channel extending through said partition and communicating with an inlet in one compartment and an outlet in the other compartment.

3. A trough construction for a spotting board comprising: a first pan-like body having a wall-like rim projecting upwardly; a second pan-like body having a wall-like rim projecting downwardly and nested within the first said wall-like rim so that the inverted bottom of the second pan-like body will be below a plane tangent to the edges of the rim of the first pan-like body, a glass top disposed on the inverted bottom with the edges of said glass top engaged by the wall-like rim of the first pan-like body; a partition dividing said first body into separate compartments, a cover of imperforate material abutting the top edge of said rim of one compartment, said partition having an opening therein for a suction channel, a suction inlet located in said other compartment and an inverted U-shaped suction channel having the open side disposed on the floor of both compartments to close said open side and to provide a suction channel extending through said partition and communicating with said inlet.

4. A trough construction for a spotting board comprising: a pan-like body having a wall-like rim projecting upwardly; a partition dividing said pan-like body into two separate compartments, a cover of imperforate material abutting the top edge of said rim to close one compartment, a cover of screen material also abutting another portion of said rim to cover the other compartment, said partition having an opening therein for a suction channel, a suction inlet located in said other compartment and an inverted U-shaped suction channel having the open side disposed on the floor of both compartments to close said open side and to provide a suction channel extending through said partition and communicating with said inlet.

GLEN C. SHOOP.
FRANK G. HOOVER.

REFERENCES CITED

The following references are of record in the file of this patent:

UNITED STATES PATENTS

| Number | Name | Date |
|---|---|---|
| 1,984,267 | Holder | Dec. 11, 1934 |
| 2,174,387 | Morken | Sept. 26, 1939 |
| 2,279,984 | Goodwin | Apr. 14, 1942 |
| 2,284,572 | Holder | May 26, 1942 |
| 2,363,956 | Glover | Nov. 28, 1944 |
| 2,399,576 | Shoop | Apr. 30, 1946 |
| 2,434,404 | Goodwin | Jan. 13, 1948 |